Patented June 8, 1954

2,680,753

UNITED STATES PATENT OFFICE 2,680,753

METHOD OF PURIFICATION OF ALKYLOLAMIDES

Joseph N. Masci and Normand Albert Poirier, New Brunswick, N. J., assignors to Johnson & Johnson, a corporation of New Jersey No Drawing. Application September 26, 1951, Serial No. 248,442

6 Claims. (Cl. 260—404)

The present invention relates to the purification of the reaction mixture obtained by condensation of long-chain fatty acids and alkanolamines. In its preferred embodiment, it is partially concerned with the purification of commercial N, N-diethanollauramide.

In the commercial preparation of diethanolamine condensation products of fatty acids such as lauric acid, in addition to the N-substituted fatty acid amide, there are formed a number of side reaction products which for many purposes are quite undesirable. The reaction mixture contains, among other things, the diethanolamine soap of the fatty acid, excess diethanolamine, and substituted piperazines as well as the fatty acid amide of diethanolamine. For certain applications (particularly those involving pharmaceutical uses) the presence of such substances in the reaction mixture is undesirable, either because they are ionic, reacting with other ionic components in finished products, or because they are irritating to the skin and mucous membranes.

In addition to the non-ionic fatty amide which is formed, there is also present in the reaction mixture a certain quantity of the ester amide and other complex condensation products. These are part of the non-ionic content of the mixture and are not objectionable in small quantities. However, if attempts are made to reduce the free fatty acid content of the reaction mixture by carrying the reaction further, the by-products increase in proportion and seriously affect the desirable properties of the amide preparation.

The removal of the undesirable components from this complex mixture is difficult. Although they are all distinguished from the amide and the pharmaceutically unobjectionable component by their water solubility, they cannot be removed by simple washing with water because the mixture is miscible with water in all proportions. Nor can the non-ionic ingredients be separated from a solution of the mixture by the addition of electrolyte, since such solutions are characterized by a tremendous capacity for binding electrolyte solutions. As a result of this characteristic, treatment of the crude amide with even saturated salt solutions does not effect purification; on the contrary, the amide becomes contaminated with substantial amounts of the salt solution which it picks up.

The object of the present invention, in general, is to provide a new and improved method of purifying alkanolamine-fatty acid condensation products. A more specific purpose is the provision of a simple, efficient and economical method of separating N,N-diethanollauramide from the reaction mixture obtained by condensation of diethanolamine with lauric acid, with the object of obtaining the N-diethanollauramide in such a state of purity that it is acceptable for pharmaceutical preparations. Further and more particular objects and advantages of the invention will be apparent as the description progresses.

The foregoing and other objects may be attained by means of the present invention. We have found that by careful control of pH and temperature, and preferably also electrolyte concentration, purification of the amides obtained by condensation of long chain fatty acids and alkanolamines can be accomplished in a remarkably simple and economical manner. The invention is based upon the discovery that if an aqueous, preferably saline solution of alkanolamine-fatty acid condensation product is adjusted to a pH between about 7 and 9, and the solution heated, a temperature is reached at which a remarkable phenomenon takes place: The homogeneous aqueous solution suddenly breaks into a heterogeneous system comprising an aqueous phase and an oily phase. The oily phase comprises the desired amide in a substantially purified form, the irritating components of the original reaction mixture being retained in substantial proportion in the aqueous phase. By discarding the aqueous phase and preferably by repeating the procedure one or more times with the oily phase, a purified amide may be obtained that is substantially non-irritating to the mucous membrane, and useful in many pharmaceutical applications for which the crude starting material is unsuited.

In order more clearly to disclose the nature of the present invention and the manner in which it may be carried into practice, two specific examples will hereinafter be described in detail. It should be clearly understood however that this is done solely by way of example and not for the purpose of either delineating the breadth of the invention or limiting the scope of the appended claims.

*Example 1*

In this example the crude product consisted of commercial diethanolamine-lauric acid condensation product sold by E. F. Drew and Company of New York city, New York, under the trade name "Syn-O-Tol L." This commercial product contains the lauramide of diethanolamine together with other reaction products. The commercial product is a dark amber-to-brown liquid with a strong penetrating odor and an extremely irritating action on the skin and mucous membrane. It is unsuited for many pharmaceutical applications.

About five gallons of this impure diethanolamine-lauric acid condensate was placed in a steam jacketed kettle and the pH adjusted to 9 by the addition of hydrochloric acid. This was followed by the addition of five gallons of water and 1 pound of sodium sulfate. At this point a clear homogeneous solution resulted. With constant stirring, the temperature of the batch was then gradually raised by means of steam. At a temperature of about 175° F. the homogeneous solution broke into two phases, a brown oily phase and an aqueous phase. While the temperature of the mixture was maintained at about 175° F., the two phases were allowed to separate and the aqueous layer was drawn off and discarded or used for other purposes.

To the separated oily phase an additional five gallons of water was added and the pH adjusted to 8 with hydrochloric acid. This was followed by addition of one pound of sodium sulfate. The resulting solution was heated with constant agitation until the temperature reached about 175° F. An aqueous phase and an oily phase again formed. The two phases while still hot were permitted to separate, and the water was drawn off and discarded.

The above procedure was repeated once more with the oily phase except that this time the pH was adjusted to 7. The final oily liquid while still hot was separated. The product thus obtained was very light amber in color, mild in odor and sufficiently non-irritating to the mucous membrane to be useful in many pharmaceutical applications for which the crude starting material was unsuited.

*Example 2*

In this example the crude starting material consisted of impure diethanolamine-lauric acid condensate as sold by the Onyx Oil and Chemical Company of Jersey City, New Jersey, under the trade name "Onyxol 336."

Using "Onyxol 336," the procedure of Example 1 was followed except that (a) no salt was employed in any stage of the procedure and (b) in each of the three stages of the procedure the pH of the aqueous solution was adjusted to 7. In all other respects the procedure and the results were substantially identical. In each stage, rapid resolution into two phases occurred at about 175° F. A light amber oily liquid of mild odor was obtained after the third stage. The final product was substantially non-irritating to the mucous membrane and suitable for many pharmaceutical applications for which the starting material was unacceptable.

In the case of both examples, irritation was tested by forming an aqueous solution containing 0.6% of the purified amide and 0.4% of a nonionic detergent (polyoxyethylenesorbitanmonolaurate as sold by Atlas Powder Company of Wilmington, Delaware under the trade name "Tween 20") to solubilize the purified oily matter in water. A drop of the aqueous solution was placed in the eye and the reaction noted. The crude product was strongly irritating, with lasting effect and reddening of the conjunctival membrane. Using the purified material prepared as described in Example 1 or 2, only a very mild, transitory irritation was noted with no lasting effects and reddening of the conjunctival membrane.

In the purification process of the present invention, where salt is used as in Example 1, the amount of salt retained by the purified amide is remarkably small. For example, when "Syn-O-Tol L" is treated in accordance with the procedure of Example 1, the purified product contains less than about one third of one percent of sodium sulfate. If, however, the same crude starting material is treated by a procedure identical with that of Example 1 except that the pH of the solution is not adjusted nor the temperature raised to the resolution temperature the oily layer which in course of time gradually separates has roughly twice the volume of the crude amide originally used. In other words, at room temperature and the normal pH of the crude product, it picks up approximately an equal volume of saturated salt solution. By adjustment of the pH of this saline solution and heating it to the "resolution temperature" the amide separates in a purified condition, substantially free of the saturated salt solution.

It will be apparent to those skilled in the art that many variations in details may be made in the foregoing examples, without departing from the spirit and scope of the invention. Thus, for example, the sodium sulfate employed in Example 1 may be replaced by any of the water-soluble salts that are commonly employed for the purpose of producing a "salting-out effect." Likewise the hydrochloric acid used in the examples for adjusting the pH may be replaced by any aqueous mineral acid that forms a water-soluble salt with the alkanolamine and piperazines present as impurities in the crude reaction mixture.

The purification procedure is applicable in principle to other primary or secondary alkanolamine-long chain fatty acid condensation products such as those obtained by condensing diethanolamine with oleic, palmitic or related fatty acids or mixtures thereof. The temperature at which separation into two phases takes place when the procedure of the present invention is carried out may vary depending on the particular starting materials used. Thus with an oleic acid-diethanolamine condensation product, treated in accordance with the present invention, separation takes place at approximately 95 to 100° F. However, in all such instances, by gradually raising the temperature of the solution while maintaining the pH between 7 and 9, the "resolution temperature" may be readily determined.

The foregoing and many other variations, modifications and extensions of the invention will be readily apparent to those skilled in the art. We therefore intend to be limited only in accordance with the following patent claims.

We claim:

1. The method of purifying the condensation product of an alkanolamine and a long-chain fatty acid, said product containing a substantial amount of alkylolamide and ionic impurities, which comprises adjusting the pH of a homogeneous aqueous solution of said condensation product to between about 7 and about 9 by addition of an acid that forms water-soluble salts with said impurities, said solution containing sufficient water to maintain said ionic impurities in solution but no substantial amount of added mutual solvent for water and alkylolamide; heating said homogeneous aqueous solution until it breaks into a heterogeneous system comprising an aqueous phase containing said ionic impurities in solution and an oily phase; and separating the oily phase from the aqueous phase.

2. The method of purifying the condensation product of dialkanolamine and a long-chain fatty acid, said product containing a substantial amount of dialkylolamide and ionic impurities, which comprises adjusting the pH of an aqueous saline solution of said condensation product to between about 7 and about 9 by addition of an acid that forms water-soluble salts with said impurities, said solution containing sufficient water to maintain said ionic impurities in solution but no substantial amount of added mutual solvent for water and dialkylolamide; heating the resulting solution until the solution suddenly resolves itself into an aqueous phase containing said ionic impurities in solution and an oily phase; and separating the resulting oily phase from the aqueous phase.

3. The method of purifying the condensation product of diethanolamine and a long-chain fatty acid, said product containing a substantial amount of diethanolamide and ionic impurities but no substantial amount of added mutual solvent for water and diethanolamine, which method comprises adding to said product water in amount sufficient ultimately to dissolve said ionic impurities thereby to form a substantially homogeneous aqueous solution of said reaction product, adjusting the pH of the solution to between about 7 and about 9 by addition of an acid that forms water-soluble salts with said impurities; heating said solution to a temperature at which the homogeneous solution breaks into an aqueous phase containing said ionic impurities in solution and an oily phase; and separating said oily phase from said aqueous phase.

4. The method of purifying the condensation product of diethanolamine with long-chain fatty acids, said product containing a substantial amount of diethanolamide and ionic impurities, which method comprises forming a substantially homogeneous aqueous solution of said reaction product essentially free of added mutual solvent for water and diethanolamide, said solution containing sufficient water to maintain a major proportion of said ionic impurities in solution, adjusting the pH of said aqueous solution to between about 7 and about 9 by means of mineral acid capable of forming water-soluble salts with diethanolamine; heating the solution to a temperature of about 175° F.; permitting the resulting oily phase containing a minor proportion of said ionic impurities to separate from the aqueous phase containing a major proportion of said ionic impurities; discarding the aqueous phase; mixing the oily phase with water in amount sufficient to dissolve a major proportion of ionic impurities remaining therein; adjusting the pH of the resulting aqueous solution with mineral acid to between about 7 and about 9; heating the resulting solution to about 175° F. until resolution into two phases takes place; separating the aqueous phase containing a major proportion of said remaining impurities from the oily phase containing a minor proportion of said remaining impurities; adding the separated oily phase to water in amount sufficient to dissolve a major proportion of further remaining ionic impurities dissolved therein; adjusting the pH to about 7; heating the solution to a temperature of about 175° F.; separating the aqueous phase containing a major proportion of said further remaining ionic impurities from the oily phase containing a minor proportion of said further remaining ionic impurities; and discarding said aqueous phase.

5. The method of claim 4 wherein in each stage of the procedure, the aqueous solution is heated in the presence of a water soluble salt dissolved in said solution.

6. The method of purifying the condensation product of an alkanolamine and lauric acid, said product containing a substantial amount of alkylolamide and ionic impurities, which comprises adjusting the pH of a homogeneous aqueous solution of said condensation product to between about 7 and about 9 by addition of an acid that forms water-soluble salts with said impurities, said solution containing sufficient water to maintain said ionic impurities in solution but no substantial amount of added mutual solvent for water and alkylolamide; heating said homogeneous aqueous solution until it breaks into a heterogeneous system comprising an aqueous phase containing said ionic impurities in solution and an oily phase; and separating the oily phase from the aqueous phase.

References Cited in the file of this patent

UNITED STATES PATENTS

| Number | Name | Date |
|---|---|---|
| 2,412,113 | Young et al. | Dec. 3, 1946 |